United States Patent
da Silva et al.

(10) Patent No.: US 10,740,539 B2
(45) Date of Patent: Aug. 11, 2020

(54) PAGE STRUCTURE ADJUSTMENTS

(71) Applicant: Hewlett-Packard Development Company, L.P., Houston, TX (US)

(72) Inventors: Dalmir Antonio da Silva, Porto Alegre (BR); Leandro Hernandes Manica, Porto Alegre (BR); Marcelo Rodrigues Correa, Porto Alegre (BR); Matheus Mirapalheta Longaray, Porto Alegre (BR); Ricardo Farias Bidart Piccoli, Porto Alegre (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/489,277

(22) Filed: Apr. 17, 2017

(65) Prior Publication Data
US 2018/0300297 A1 Oct. 18, 2018

(51) Int. Cl.
*G06F 17/20* (2006.01)
*G06F 40/14* (2020.01)
*G06F 40/114* (2020.01)
*G06F 40/106* (2020.01)

(52) U.S. Cl.
CPC ............ *G06F 40/14* (2020.01); *G06F 40/106* (2020.01); *G06F 40/114* (2020.01)

(58) Field of Classification Search
CPC .......................... G06F 17/2247; G06F 17/248
See application file for complete search history.

(56) References Cited

U.S. PATENT DOCUMENTS

| | | | |
|---|---|---|---|
| 5,214,755 A | 5/1993 | Mason | |
| 5,555,362 A * | 9/1996 | Yamashita | ......... G06K 9/00463 382/173 |
| 7,246,311 B2 | 7/2007 | Bargeron | |
| 7,707,508 B1 * | 4/2010 | Moskalonek | ........... G06T 11/60 715/762 |
| 7,788,579 B2 | 8/2010 | Berkner et al. | |
| 8,332,743 B2 * | 12/2012 | Miyazawa | ............ G06F 40/114 715/230 |

(Continued)

OTHER PUBLICATIONS

Apple, Inc., "Views with Intrinsic Content Size", Mar. 21, 2016, https://developer.apple.com, 14 pages.

*Primary Examiner* — Shahid K Khan
(74) *Attorney, Agent, or Firm* — Brooks Cameron & Huebsch PLLP

(57) ABSTRACT

Example implementations relate to page structure adjustments. The system may convert a binary tree representation of a plurality of content items to an initial page structure that includes a plurality of regions. The system may determine a region metric of each of the plurality of regions. The system may determine an item metric of each of the plurality of content items rendered on a respective region of the plurality of regions. The system may calculate an error associated with the initial page structure based on the region metric and the item metric for each of the plurality of regions. The system may generate a plurality of adjusted page structures and calculate an error associated with each adjusted page structure. The system may select an adjusted page structure from the plurality of adjusted page structures based on the selected adjusted page structure being associated with an error below a threshold.

16 Claims, 3 Drawing Sheets

(56) References Cited

U.S. PATENT DOCUMENTS

| | | | | |
|---|---|---|---|---|
| 8,539,342 B1* | 9/2013 | Lewis | G06F 17/212 | 715/243 |
| 9,230,342 B1* | 1/2016 | Yates | G06T 9/40 | |
| 9,317,491 B2 | 4/2016 | Grizim et al. | | |
| 9,736,395 B2* | 8/2017 | Ramon | H04N 5/2624 | |
| 2002/0040375 A1* | 4/2002 | Simon | G06T 11/60 | 715/251 |
| 2002/0122067 A1* | 9/2002 | Geigel | G06K 9/6229 | 715/788 |
| 2003/0229845 A1* | 12/2003 | Salesin | G06F 16/9577 | 715/249 |
| 2004/0107403 A1* | 6/2004 | Tetzchner | G09G 5/00 | 715/227 |
| 2004/0177316 A1* | 9/2004 | Layzell | G06T 11/60 | 715/246 |
| 2005/0094205 A1* | 5/2005 | Lo | G06F 17/212 | 358/1.18 |
| 2005/0094206 A1* | 5/2005 | Tonisson | G06F 17/211 | 358/1.18 |
| 2006/0107204 A1* | 5/2006 | Epstein | G06F 17/212 | 715/243 |
| 2006/0236230 A1* | 10/2006 | Lin | G06F 40/103 | 715/210 |
| 2007/0083810 A1* | 4/2007 | Scott | G06F 16/957 | 715/205 |
| 2007/0288843 A1* | 12/2007 | Makino | G06F 17/212 | 715/243 |
| 2009/0089660 A1* | 4/2009 | Atkins | G06Q 50/10 | 715/243 |
| 2010/0077321 A1* | 3/2010 | Shen | G06F 16/9577 | 715/760 |
| 2012/0042240 A1* | 2/2012 | Oliveira | G06F 17/212 | 715/243 |
| 2012/0254733 A1* | 10/2012 | Tucovic | G06F 40/106 | 715/243 |
| 2013/0205199 A1* | 8/2013 | Damera-Venkata | G06F 17/248 | 715/243 |

* cited by examiner

PAGE STRUCTURE ADJUSTMENTS

BACKGROUND

Constructing a document may include converting content into a page structure. Adjusted page structure templates may be utilized to accommodate the content within the page structure. Content may have varied formats. Accommodation of the varied content may involve an increased number of adjusted page structure templates. Storage of the increased number of adjusted page structure templates may consume storage resources.

DETAILED DESCRIPTION

Figure 1:
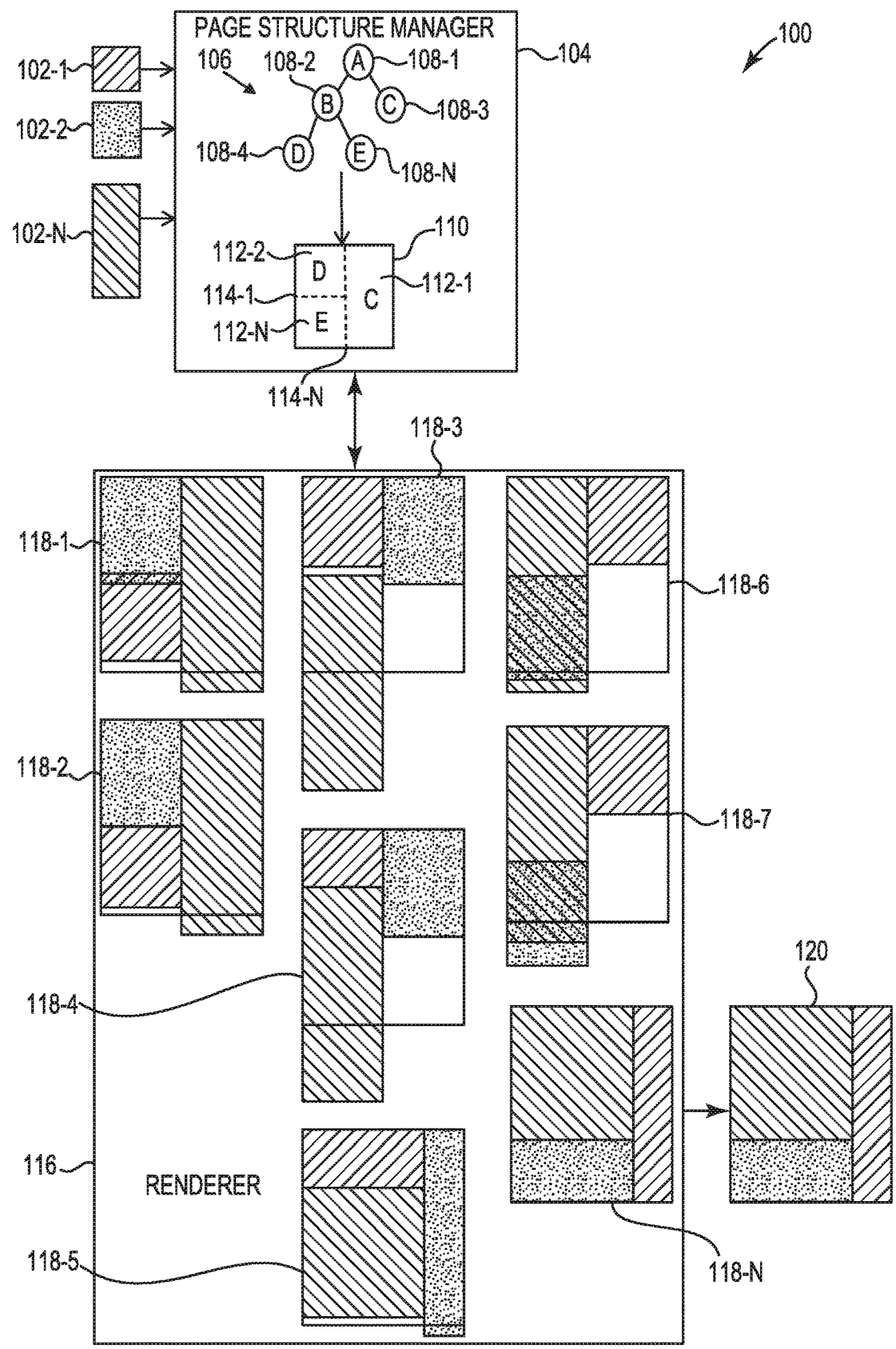
FIG. 1 illustrates a diagram of an example of a system for page structure adjustments according to the disclosure.

Constructing a document may include converting content into a page structure. As used herein, a document may include an electronic file including digital content. The document may be a document to be used for electronic publishing, website development, printing, storage, etc.

The document may have a specific format. A specific format of a document may be defined by the characteristics of a page of a paginated document. For example, a specific format may include a maximum size, a maximum area, a maximum height, a maximum width, a maximum margin, and/or various other limitations on the physical or virtual characteristic of the document. In an example, a document may be a document to be printed on an 8.5×11-inch printable medium. In such an example, the specific format of the document may include a maximum width of 8.5 inches and a maximum height of 11 inches.

The content may include digital content. For example, the content may include digital representations of graphical items, text, numbers, letters, chunks of text, images, graphics, pictures, tables, graphs, arbitrarily rich markup content such as webpage material in a markup (e.g., Hypertext Markup Language (HTML), Extensible Hypertext Markup Language (XHTML), etc.) of a webpage, etc. The content may be extracted from a source such as a separate document, a webpage, etc.

The document may be created utilizing a page structure. As used herein, a page structure may include a layout of the content within the format limitations associated with the document. A page structure may include a pattern of arrangement of the content within the document. A page structure may include various regions of the document where content may be placed.

A page structure may be based on a template. A template may include a predefined static page structure applicable to placement of content within the document. A template may include a plurality of regions of the document where content may be placed. For example, a template may include a blank document devoid of content that is pre-segmented into regions which content may be added into. The template may be fixed. That is, the regions of the template may have fixed dimensions or content specifications. Therefore, the template may be limited with respect to the type of content and/or the physical characteristics of the content that will fit within the template. When certain content will not fit into the regions of the template either a different template may be selected or the content may be modified to fit within the template.

Modifying the content may include altering, truncating, or otherwise distorting the content. Modifying the content may result in an unaesthetic appearance of the content in the final document. Alternatively, preserving the content without modification may, as described above, include utilizing an alternative template that will accommodate the content. Therefore, accommodating a variety of content may involve utilizing a variety of templates. Because content may be so varied, a template system for constructing documents may need to utilize a relatively large and/or nearly infinite array of templates to accommodate all the content varieties available in today's digital world. The computational and storage resources consumed in producing and storing the wide variety of templates may represent a burden to a template-based system of document construction.

Once a template has been selected for given content the document may be rendered. Rendering a document may include the process of generating a digital image of the content in the document according to the template. Rendering a document may be performed by a renderer. A renderer may include computer-readable instructions stored in a computer readable medium and executable by a processor to process content and a template to output a digital image file of the document including the content arranged according to the template.

Modifications to content in order to fit the content to the template may occur prior to rendering. The modifications may be based on predictions of the content's ability to fit within the template prior to rendering. The predictions may be based on, for example, comparisons of crude estimations of character capacity available in a region of a template and a number of characters included in content. However, these predications may be error prone and may fail to account for size differences in individual fonts, glyphs, point sizes, etc.

In contrast, examples described herein may include a system of page structure adjustment based on actual metrics collected from renderings of the content within a potential page structure for the final document. For example, the system may include converting a binary tree representation of a plurality of content items to a page structure that includes a plurality of regions. The system may include determining from a rendering of the content into the page structure, a region metric of each of the plurality of regions of the page structure. The system may further include determining, from the rendering, an item metric of each of the plurality of content items rendered on a respective region of the plurality of regions. The system may include calculating an error associated with the page structure based on the region metric and the item metric for each of the plurality of regions. The system may include iteratively adjusting the page structure until the error associated with the page structure is below a threshold. The system may then include selecting an adjusted page structure with the error below the threshold to render the document.

FIG. 1 illustrates a diagram of an example of a system 100 for page structure adjustment according to the disclosure. The system 100 may include content 102-1 . . . 102-N, collectively referred to as content 102 hereinafter. The content 102 may include digital content. The content may include digital representations of graphical items, text, numbers, letters, chunks of text, images, graphics, pictures, tables, graphs, arbitrarily rich markup content such as webpage material in a markup (e.g., Hypertext Markup Language (HTML), Extensible Hypertext Markup Language (XHTML), etc.) of a webpage, etc.

The content 102 may be selected and/or submitted by a user. The content may be extracted from another input source such as a document, a database, a web feed, etc. The content 102 may be sourced by computer-readable instructions executable by a processor to extract content from the input source. For example, the content 102 may be extracted by a web content extractor designed to extract and update content extracted from various inputs.

The system 100 may include a page structure manager 104. The page structure manager 104 may include computer-readable instructions executable by a processor to perform the operations described in detail below. The page structure manager 104 may receive content 102. The page structure manager 104 may utilize the content 102 to generate a binary tree 106 representation of the content 102 within the document. The binary tree 106 may include a full binary tree structure. As used herein a full binary tree may include a tree structure in which every node other than the leaves has two children. For example, the binary tree 106 may represent a regional placement strategy for the content 102. In some examples, the page structure manager may not generate the binary tree 106, but rather may receive the binary tree 106 with the content 102.

The binary tree 106 may include a plurality of nodes 108-1 . . . 108-N. The position of each of the plurality of nodes 108-1 . . . 108-N within the binary tree 106 may be instructive with regard to constructing a potential layout of the content 102 within the document. For example, the binary tree may include a root node (e.g., 108-1). The root node may represent the entire document or all the content 102 to be rendered into the document, but may not correspond to a particular region on the document or a particular item of content 102. The binary tree 106 may include internal nodes (e.g., nodes 108-1 and 108-2). Internal nodes may be nodes that are represent a branching point and are split into further nodes. The internal nodes may not correspond to a particular region of the document or a particular item of content 102. Instead, the internal nodes may correspond to the entire document or all the items of content 102, as in the case of an internal root node (e.g., 108-1). Additionally, the internal nodes may correspond to a plurality of regions of the document but less than the entire document or a plurality of items of content 102 but less than all the items of content 102, as in the case of non-root internal nodes (e.g., 108-2).

The binary tree may include leaf nodes (e.g., 108-3, 108-4, and 108-N). Leaf nodes may include nodes that are not further split and/or do not represent a branching point in the binary tree 106. For example, leaf node 108-4 may be a terminus point of the binary tree 106. Each one of the leaf nodes may represent a single item of content 102 and/or a region of the document that will hold an individual item of content 102 upon rendering. For example, leaf node 108-3 may represent a region of a document that will hold content item 102-N upon rendering. Leaf node 108-4 may represent a region of a document that will hold content item 102-2 upon rendering. Leaf node 108-N may represent a region of a document that will hold content item 102-1 upon rendering.

The page structure manager 104 may convert the binary tree representation 106 of the plurality of items of content 102 to a page structure 110. A page structure 110 may include a representation of a document. The page structure 110 may map a plurality of regions 112-1 . . . 112-N onto the representation where items of content 102 may be placed.

The page structure 110 may be an adjustable page structure. As used herein, an adjustable page structure may include a page structure that may be adjusted. For example, an area of a region 112-1 . . . 112-N may be increased or decreased. The page structure 110 may be an initial page structure. An initial page structure may be a page structure 110 that is a first page structure generated from the binary tree 106. An initial page structure may be a page structure 110 that serves as a starting point or a basis for subsequent adjusted page structures.

Converting the binary tree 106 to the page structure 110 may include generating an orthogonal bisection 114-1 . . . 114-N of the page structure 110. The orthogonal bisection 114-1 . . . 114-N may be a vertical bisection or a horizontal bisection of the page structure. In the binary tree 106 an internal node (e.g., nodes 108-1 and 108-2) may represent and/or trigger an orthogonal bisection 114-1 . . . 114-N in the conversion process. For example, internal node 108-1 may represent and/or trigger vertical orthogonal bisection 114-N and internal node 108-2 may represent and/or trigger additional horizontal orthogonal bisection 114-1 in the page structure 110.

Each region 112-1 . . . 112-N resulting from an orthogonal bisection 114-1 . . . 114-N may be further bisected until the free space of the page structure 110 has been partitioned into N regions 112-1 . . . 112-N, where N is the number of content items 102 to be inserted in to the document that the page structure 110 represents. Thus, N may correspond to the number of leaf nodes (e.g., 108-3, 108-4, and 108-N) in the binary tree 106. Each leaf node (e.g., 108-3, 108-4, and 108-N) and each item of content 102 associated therewith may be assigned to a corresponding region 112-1 . . . 112-N of the page structure 110. For example, the leaf node 108-4 and its corresponding content item 102-2 may be assigned to region 112-2 in the page structure 110. The leaf node 108-N and its corresponding content item 102-1 may be assigned to region 112-N in the page structure 110. The leaf node 108-3 and its corresponding content item 102-N may be assigned to region 112-1 in the page structure 110.

The page structure manager 104 may send the page structure 110 and/or content items 102 to a renderer 116 to be rendered. A renderer 116 may include computer-readable instructions executable by a processor to render items of content 102 into a document based on a page structure 110. The renderer 116 may process items of content 102 and the page structure 110 to output a digital image of the document including the content 102 arranged according to the page structure 110 (e.g., rendering 118-1 . . . 118-N). The rendering 118-1 . . . 118-N output by the renderer 116 may not be displayed to a user, but may rather be performed as a background process to generate a digital image of the document including the items of content 102 arranged according to the page structure 110 from which metrics of the rendered document may be collected or queried without displaying the image to a user. The characteristics of the region 112-1 . . . 112-N and/or the item of content 102 as represented in the page structure 110 may be fixed with regard to a single instance of rendering. That is, the renderer 116 may render the items of content 102 into the regions 112-1 . . . 112-N regardless of consequences including overrun, underrun, overlapping text, etc.

In some examples, the renderer 116 may include a portion of a web browser, a typesetter, a dedicated renderer, etc. The renderer 116 may include a component of the system 100 that is produced and/or distributed by a third party relative to the page structure manager 104. The renderer 116 may include any computer-readable instructions executable by a processor to render items of content 102 into a document so long as those computer-readable instructions are executable by the processor to provide metrics associated with the rendering to a page structure manager 104. As such, the system 100 may utilize a renderer 116 in any existing third party application that is able to provide metrics regarding its renderings.

As used herein, a metric associated with a rendering 118-1 . . . 118-N may include a region metric and an item metric. A region metric may include an area of a region 112-1 . . . 112-N. For example, a region metric may include a width and/or a height of a region 112-1 . . . 112-N as it is instantiated in a specific rendering 118-1 . . . 118-N of the items of content 102 according to the page structure 110. The width and/or height may be accurate down to a pixel level of the specific rendering 118-1 . . . 118-N. The region metric may include an area determined from the above described width and/or height.

An item metric may include an area occupied by an item of rendered content 102. For example, an item metric may include a width and/or a height of an item of content 102 as it is instantiated in a specific rendering 118-1 . . . 118-N of the items of content 102 according to the page structure 110. The width and/or height may be accurate down to a pixel level of the specific rendering 118-1 . . . 118-N. The item metric may include an area determined from the above described width and/or height.

The page structure manager 104 may determine a region metric from a specific rendering 118-1 . . . 118-N of the items of content 102 according to the page structure 110. The page structure manager 104 may determine a region metric for each of the plurality of regions 112-1 . . . 112-N rendered in the specific rendering 118-1 . . . 118-N. The page structure manager 104 may determine the region metrics by querying the renderer 116 for the metrics and/or receiving the metrics from the renderer 116.

The page structure manager 104 may determine an item metric from a specific rendering 118-1 . . . 118-N of the items of content 102 according to the page structure 110. The page structure manager 104 may determine an item metric of each of the plurality of items of content 102 rendered to a respective corresponding region 112-1 . . . 112-N in the specific rendering 118-1 . . . 118-N. The page structure manager 104 may determine the item metrics by querying the renderer 116 for the metrics and/or receiving the metrics from the renderer 116.

The page structure manager 104 may calculate an error associated with the page structure 110. The error may be calculated based on the region metric and the item metric for each of the plurality of regions 112-1 . . . 112-N and/or their corresponding item of content 102 rendered into the region 112-1 . . . 112-N. For example, the page structure manager 104 may send the content items 102-1, 102-2, and 102-N along with the page structure 110 to the renderer 116. The renderer 116 may generate a rendering 118-1 of the content items 102-1, 102-2, and 102-3 according to the page structure 110. The renderer 116 may provide the page structure manager 104 with an item metric and a region metric for each of the rendered regions and the corresponding content item rendered respectively therein. That is, the renderer 116 may provide the page structure manager 104 with region metrics and item metrics on a rendered region-by-rendered region basis, where each rendered region corresponds to a region 112-1 . . . 112-N defined in the page structure.

The page structure manager 104 may calculate an error associated with each region 112-1 . . . 112-N of the page structure 110 utilizing the provided metrics. For example, the page structure manager 104 may calculate an error corresponding to region 112-1 of the page structure 110. Since leaf node 108-3 corresponds to region 112-1 in this example, the error may also correspond to leaf node 108-3. The page structure manager 104 may calculate the error based on a region metric for the portion of rendering 118-1 corresponding to the space occupied by region 112-1. The page structure manager 104 may additionally calculate the error based on an item metric for the portion of the rendering 118-1 corresponding to the space occupied by the content item 102-N. The content item 102-N may be the content item 102-N that was rendered into the portion of rendering 118-1 corresponding to the space occupied by region 112-1. The page structure manager 104 may calculate the error by comparing an area occupied by the rendering of content item 102-N to an area occupied by the rendering of region 112-1. For example, the page structure manager 104 may calculate a difference between the area of the space occupied by the portion of rendering 118-1 corresponding to the space occupied by region 112-1 and the area of the space occupied by the portion of the rendering 118-1 corresponding to the space occupied by the content item 102-N rendered into the portion of rendering 118-1 corresponding to the space occupied by region 112-1. Stated differently, the page structure manager 104 may calculate the error for each rendered region of the rendering 118-1 based on the difference between the areas occupied by a rendered region and the area occupied by content rendered into the rendered region. Again, the item of content 102 to be rendered may not be modified. As such, differences between the area occupied by a rendered region and the area occupied by content rendered into the rendered region may be preserved in the rendering 118-1.

The difference between the areas and, consequently, the error the difference may represent may be positive, negative, or zero. For example, where the difference is calculated by subtracting the area occupied by a rendered region from the area occupied by content rendered into the rendered region, a zero difference would be indicative of an exact fit. In this example, a positive difference would be indicative that the rendered content item takes up less space than is provided to the rendered region (e.g., an underrun of the rendered content item relative to the rendered region) Further, in this example, a negative difference would be indicative that the rendered content item is taking up more space than is provided by the rendered region (e.g., an overrun of the rendered content item relative to the rendered region).

The page structure manager 104 may continue to calculate the error associated with the page structure 110 by repeating the error calculation for the remaining rendered regions of the rendering 118-1. For example, the page structure manager 104 may repeat the error calculation for the portion of the rendering 118-1 corresponding to region 112-2 of the page structure 110 and corresponding to leaf node 108-4 based on a region metric for the portion of rendering 118-1 corresponding to the space occupied by region 112-2 and an item metric for the portion of the rendering 118-1 corresponding to the space occupied by the content item 102-2 rendered into the portion of rendering 118-1 corresponding to the space occupied by region 112-2. In continuing the example, the page structure manager 104 may repeat the error calculation for the portion of the rendering 118-1 corresponding to region 112-N of the page structure 110 and corresponding to leaf node 108-N based on a region metric for the portion of rendering 118-1 corresponding to the space occupied by region 112-N and an item metric for the portion of the rendering 118-1 corresponding to the space occupied by the content item 102-1 rendered into the portion of rendering 118-1 corresponding to the space occupied by region 112-N.

As a result, the page structure manager 104 may have calculated an individual error associated with each individual rendered region corresponding to a respective region 112-1 . . . 112-N of page structure 110 and further corresponding to a respective leaf node (e.g., 108-3, 108-4, and 108-N) of binary tree 106. However, the page structure manager 104 may have calculated an overall error associated with the overall rendering 118-1, the overall page structure 110, and the root node 108-1 of the binary tree 106 based on the cumulative individual errors described above.

The individual errors and/or the overall error described above may be utilized by the page structure manager 104 to adjust page structure 110 to generate an adjusted page structure (not illustrated in FIG. 1 for clarity purposes). An adjusted page structure is a page structure that is different from the page structure 110. Adjusting the page structure 110 may include modifying the page structure 110. Modifying the page structure 110 may include modifying the area, margins, height, and/or width of a region 112-1 . . . 112-N. While the spacing, margins hyphenation, and/or line break placement of the item of content 102 assigned to be rendered in a particular region 112-1 . . . 112-N in the page structure 110 may be modified to improve aesthetics, such modifications may not result in an adjustment of the page structure 110. In some examples, the page structure manager 104 may be constrained from modifying a font associated with an item of content 102 from its original size in order to preserve document aesthetics.

The precise modification to the page structure may be identified based on the individual errors and/or the overall error described above. For example, if an error determined from a first rendered region and a corresponding first rendered content item rendered in the region is indicative of an overrun of the rendered content item relative to the rendered region then the page structure manager 104 may adjust the region 112-1 . . . 112-N corresponding to the rendered region by increasing an area of the corresponding region 112-1 . . . 112-N in an adjusted page structure. The modification may be identified because it is: a modification that reduces the error associated with a rendered region or rendered regions compared to a previous page structure, brings the error associated with a rendered region or rendered regions closer to zero, and/or reduces the error associated with a rendered region or rendered regions below a threshold amount. The modification may be identified because it produced the above described error reductions with respect to an individual region or cumulative across all regions.

The adjusted page structure generated by the page structure manager 104 may then be sent to the renderer 116 for rendering. This process may proceed iteratively with the page structure manager 104 creating an adjusted page structure for each potential iteration of content item 102 to region 112-1 . . . 112-N assignment for a given binary tree 106. The page structure manager 104 may also generate adjusted page structures within each iteration of content item 102 to region 112-1 . . . 112-N assignment for a given binary tree 106. For example, for each iteration of content item 102 to region 112-1 . . . 112-N assignment a page structure manager 104 may generate an adjusted page structure corresponding to a modification of a first region or regions (e.g., 112-2 and 108-N). Then the page structure manager 104 may generate an additional adjusted page structure from that adjusted page structure, where the additional adjusted page structure corresponds to a modification of a second region or regions (e.g., 112-1). The process may result in the generation of a plurality of adjusted page structures by the page structure manager 104.

Each adjusted page structure may be sent to the renderer 116 for rendering. As such, the render 116 may render, in a background process, a plurality of discrete renderings 118-1 . . . 118-N. Each of the plurality of renderings 118-1 . . . 118-N can be rendered according to a particular adjusted page structure received from the page structure manager 104. The renderer 116 may provide the item metrics and the region metrics for each of the renderings 118-1 . . . 118-N back to the page structure manger 104. The page structure manager 104 may utilize the metrics to calculate the above described individual and/or overall errors associated with the adjusted page structure and utilize those errors to generate a next iteration of an adjusted page structure by modifying the previously rendered adjusted page structure according to the error. In some examples, the page structure manager 104 may iteratively adjust the page structure until the error associated with the page structure is below a threshold amount.

The overall error associated with the adjusted page structure associated with each rendering 118-1 . . . 118-N may be utilized to select an adjusted page structure to render the final document 120. For example, the page structure manager 104 may select the adjusted page structure corresponding to the particular rendering 118-1 . . . 118-N that produced the smallest amount of overall error as compared to the overall error associated with the other adjusted page structures. In some examples, the page structure manager 104 may select an adjusted page structure from a plurality of adjusted structures to render a final document 120 based on the selected adjusted page structure being associated with an error below a threshold. In some examples, the threshold may include a second lowest error associated with the plurality of adjusted page structures.

The page structure manager 104 may instruct the renderer 116 to render a final document 120 based on provided content items 102 and a provided selected adjusted page structure. In an example, the page structure manager 104 may send the items of content 102 and/or the selected adjusted page structure to the renderer 116 to render to the final document. The page structure manager 102 may refine the selected adjusted page structure by truncating a portion of the content items 102 to be rendered to the final document 120 prior to providing the selected adjusted page structure to the renderer 116. The final document 120 may include a final rendering of a document based on the content 102 and the selected adjusted page structure. The final document 120 may include a document that is visible to a user. For example, the final document 120 may be a document that is to be displayed. The final document 120 may be a document that is to be printed, published, electronically published, and/or otherwise incorporated into medium visible to a user.

Figure 2:
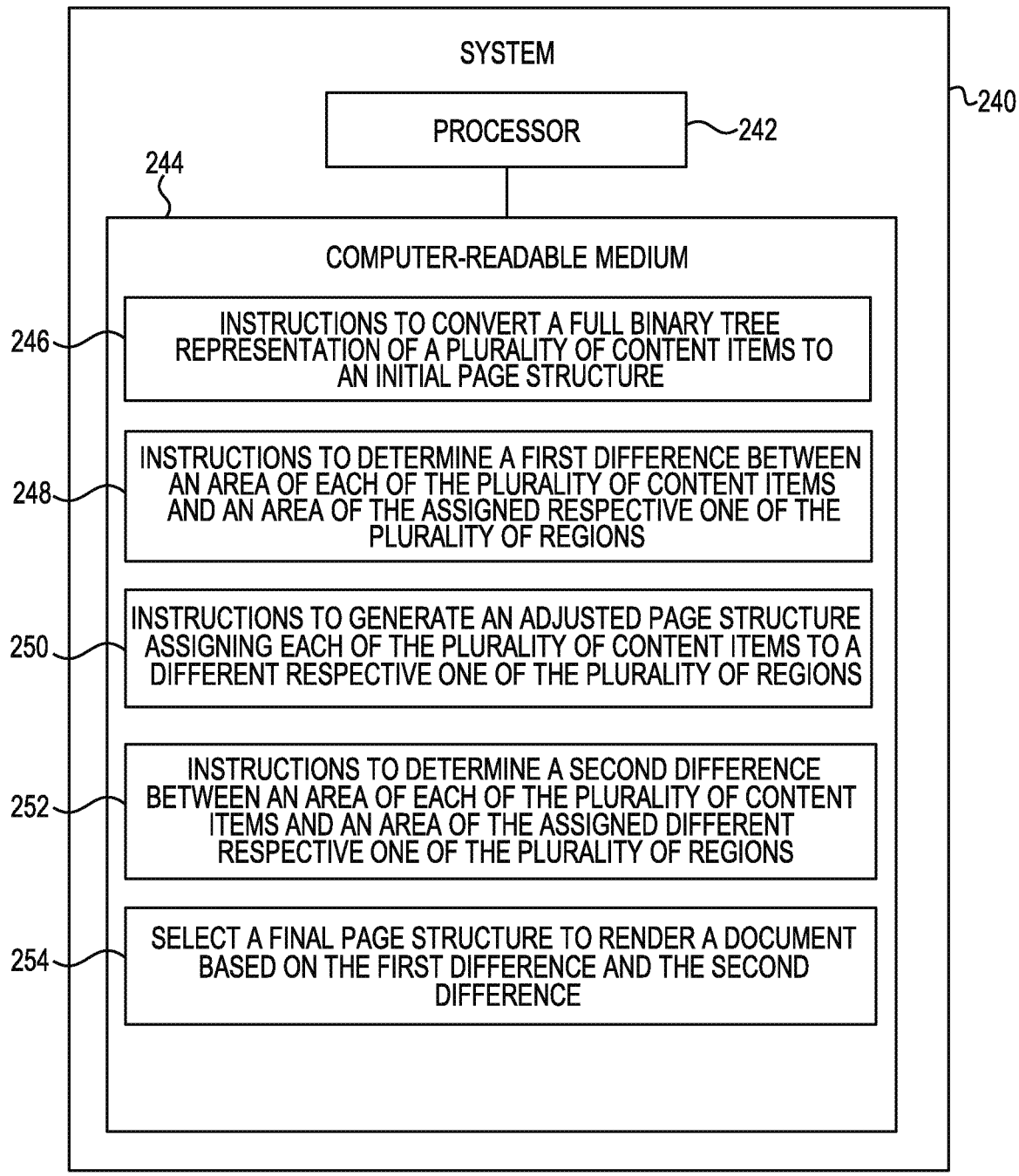
FIG. 2 is a block diagram of an example of a system for page structure adjustments according to the disclosure.

FIG. 2 is a block diagram of an example system 240 for page structure adjustment according to the present disclosure. System 240 may be the same as or different than, system 100 illustrated in FIG. 1. System 240 may include at least one computing device that is capable of communicating with at least one remote system. In the example of FIG. 2, system 240 includes a processor 242 and a computer-readable medium 244. Although the following descriptions refer to a single processor and a single computer-readable medium, the descriptions may also apply to a system with multiple processors and computer-readable mediums. In such examples, the instructions may be distributed (e.g., stored) across multiple computer-readable mediums and the instructions may be distributed (e.g., executed by) across multiple processors.

Processor 242 may be a central processing unit (CPUs), a microprocessor, and/or other hardware devices suitable for retrieval and execution of instructions stored in computer-readable medium 244. In the particular example shown in FIG. 2, processor 242 may receive, determine, and send instructions 246, 248, 250, 252, and 254 for page structure adjustment. As an alternative or in addition to retrieving and executing instructions, processor 242 may include an electronic circuit comprising a number of electronic components for performing the functionality of an instruction in computer-readable medium 244. With respect to the executable instruction representations (e.g., boxes) described and shown herein, it should be understood that part or all of the executable instructions and/or electronic circuits included within a particular box and/or may be included in a different box shown in the figures or in a different box not shown.

Computer-readable medium 244 may be any electronic, magnetic, optical, or other physical storage device that stores executable instructions. Thus, computer-readable medium 244 may be, for example, Random Access Memory (RAM), an Electrically-Erasable Programmable Read-Only Memory (EEPROM), a storage drive, an optical disc, and the like. Computer-readable medium 244 may be disposed within system 240, as shown in FIG. 2. In this situation, the executable instructions may be "installed" on the system 240. Additionally and/or alternatively, computer-readable medium 244 may be a portable, external or remote storage medium, for example, that allows system 240 to download the instructions from the portable/external/remote storage medium. In this situation, the executable instructions may be part of an "installation package". As described herein, computer-readable medium 244 may be encoded with executable instructions for page structure adjustment.

Referring to FIG. 2, instructions 246, when executed by a processor (e.g., 242), may cause system 240 to convert a binary tree representation of a plurality of content items to an initial page structure. The initial page structure may include instructions to a rendered. The initial page structure may define a plurality of regions. The plurality of regions may correspond to portions of a document to be rendered. The plurality of regions may include the portions of the document that are designated to hold content items when rendered.

The initial page structure may include an assignment of each of a plurality of content items to a respective one of the plurality of regions. An assignment of a content item to a region may include a designation that the assigned content item is to be rendered to the region that it is assigned to. The content item may include arbitrarily rich markup content such as webpage material in a markup (e.g., Hypertext Markup Language (HTML), Extensible Hypertext Markup Language (XHTML), etc.) of a webpage, etc. The system 240 may be able to accept a wide variety of markup content and remain agnostic to its complexity since the system is able to adjust a page structure to any type of content by utilizing precise metrics captured from renderings of the content items instead of trying to predict a fit based on prior knowledge of the content items.

Instructions 248, when executed by a process (e.g., 242), may cause system 240 to determine a first difference between an area of each of the plurality of content items and an area of the assigned respective one of the plurality of regions. The area of each of the plurality of content items and the area assigned to a respective one of the plurality of regions may be determined from a measurement of a first background rendering of the initial page structure resulting from conversion of the binary tree representation. A background rendering may be a rendering executed in substantially real-time as part of a background process not visible to a user. As such, the background rendering may not be displayed.

Since the initial page structure is rendered, however, metrics of the rendering may be collected. For example, a height and widths associated with an amount of space occupied by a rendered content item and/or associated with a region dedicated to rendering that content item may be identified with pixel precision. From these metrics, an area associated with the content item and an area associated with a region assigned to the content item may be calculated.

The difference between an area occupied by a rendered content item and an area of a region where the content was rendered may be instructive with regard to an adjustment that may be applied to one or the other. For example, if the area occupied by a rendered content item is larger than the area of a region where the content is rendered then an area of the region where the content is rendered may be increased to prevent content item overrun and/or content item overlap in a rendered document.

Instructions 250, when executed by a processor (e.g., 242), may cause system 240 to generate an adjusted page structure. The adjusted page structure may include an assignment of each of the plurality of content items to a different respective one of the plurality of regions. That is, the adjusted page structure may be a modified version of the initial page structure having a different content item to region assignment than the initial page structure.

In some examples, a plurality of adjusted page structures may be generated. For example, each adjusted page structure having a different content item to region assignment than the initial page structure may be further adjusted to generate additional adjusted page structures. The additional adjusted page structures may include modifications to a page structure that reduce a difference between an area of a rendered content item and a region of the rendering the content item is assigned to.

Instructions 252, when executed by a processor (e.g., 242), may cause system 240 to determine a second difference between an area of each of the plurality of content items and an area of the assigned different respective one of the plurality of regions. The second difference may be may be determined from a measurement of a second background rendering of the adjusted page structure.

For example, a renderer may render the plurality of content items into a respective plurality of regions that are different from the plurality of regions utilized in the first background rendering. Metrics may be collected from the second background rendering. For example, a height and a width associated with an amount of space occupied by a rendered content item and/or associated with a region dedicated to rendering that content item may be identified with pixel precision. From these metrics, an area associated with the content item and an area associated with a region assigned to the content item may be calculated. From the area associated with the content item and an area associated with a region assigned to the content item the second difference may be determined.

Instructions 254, when executed by a processor (e.g., 242), may cause system 240 to select a final page structure to render a document. The final page structure may be selected based on the first difference and the second difference.

The final page structure may be selected from the initial page structure and the adjusted page structure. For example, the final page structure may be selected from the initial page structure or the adjusted page structure depending on which resulted in a rendering with a smaller difference between the area occupied each of the plurality of rendered content items and an area of the assigned respective one of the plurality of rendered regions. Therefore, the final page structure may be a page structure that offers an increased correlation between proportion of the document that the content items occupied and a proportion of the region of the document assigned to accommodate the rendered content.

The final page structure may be submitted to a renderer to render a final document. The final page structure may be refined through truncation of the content items to be rendered before it is submitted to the renderer. The final document may be a rendered document that will be displayed.

Figure 3:
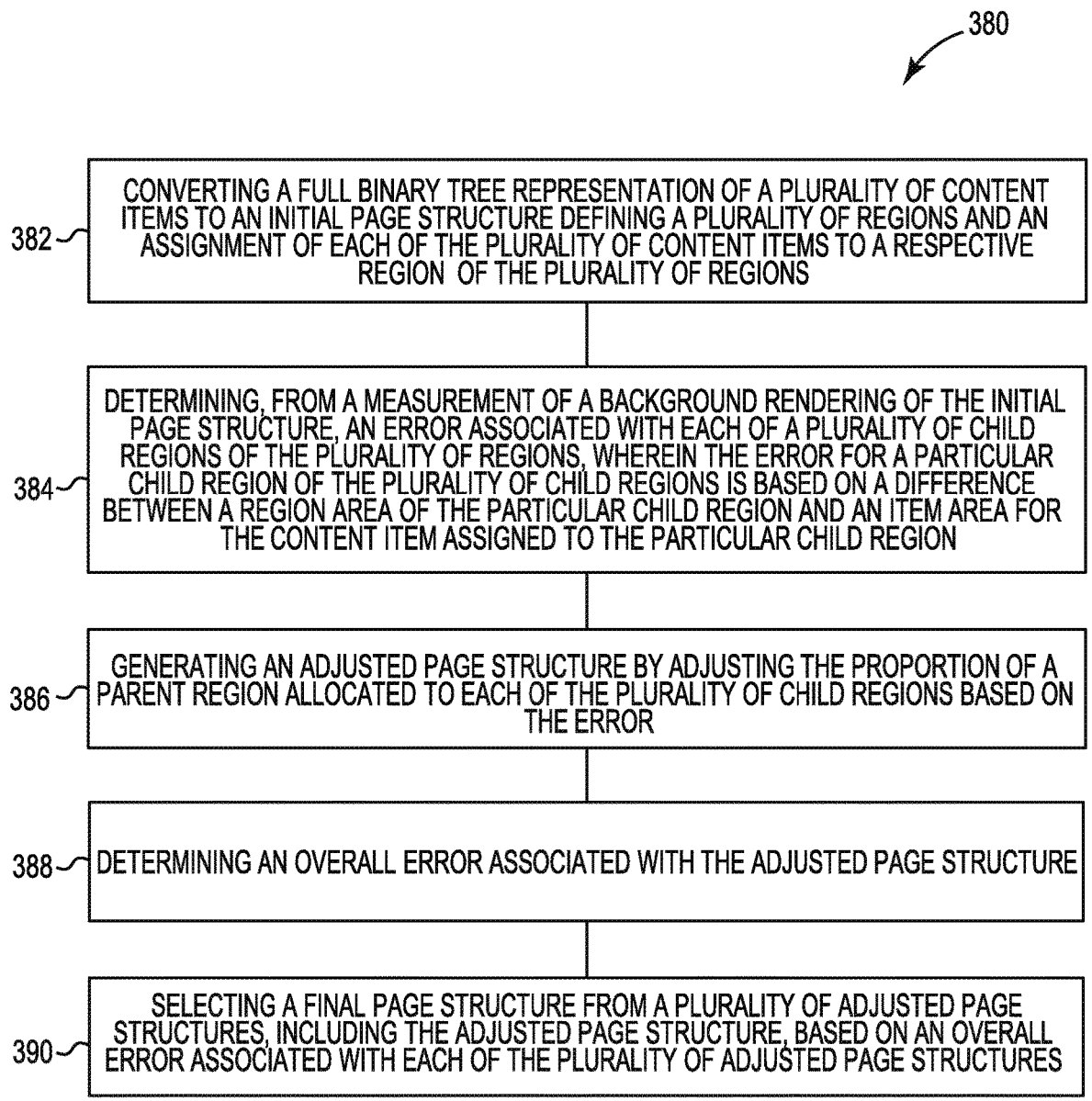
FIG. 3 illustrates an example of a method of page structure adjustments according to the disclosure.

FIG. 3 illustrates an example of a method 380 of page structure adjustment according to the disclosure. At 382, the method 380 may include converting a binary tree representation of a plurality of content items to an initial page structure. The initial page structure may define a plurality of regions. The plurality of regions may include a plurality of regions of a document to be rendered.

The initial page structure may also define an assignment of each of the plurality of content items to a respective region of the plurality of regions. For example, the initial page structure may include a number of regions created by orthogonal bisection of a page corresponding to a document to be rendered. The initial page structure may specify which of the regions each of the content items should initially be rendered in.

At 384, the method 380 may include determining an error associated with each of a plurality of child regions of the plurality of regions. The error may be determined from a measurement of a first background rendering of the initial page. A child region may be a region of the initial page structure that corresponds to a leaf node on the binary tree representation. A child region may be a child of a parent region. A parent region may include an inner node of the binary tree representation. Since the parent region may represent a bifurcation in the binary tree representation, each parent node may have at least two child nodes. Whether a region is a parent region or a child region may be determined based on the binary tree representation.

The error associated with a particular child region may be determined based on a difference between a region area of the particular child region determined from the first background rendering and an item area for the rendered content item assigned to the particular child region also determined from the first background rendering. The error associated with each child region of the plurality of child regions may be determined using the first background rendering.

At 386, the method 380 may include generating an adjusted page structure by adjusting the proportion of a parent region allocated to each of the plurality of child regions based on the error. As described above, a parent region may include a plurality of child regions and determining the parent region and the plurality of child regions may be based on the binary tree representation. In an example where a parent region has two child regions, then a parent region of the adjusted page structure may be subdivided by a horizontal or vertical orthogonal bisection into two component child regions.

Adjusting the proportion of the parent region allocation to each of the child regions may include increasing the area of one of the child regions by decreasing the area of the other child regions. Adjusting the proportion based on the error associated with each of a plurality of child regions may include interpreting which of the rendered child regions could use more area to accommodate its assigned rendered content item and which of the rendered child regions could forfeit some of its area and still accommodate its assigned rendered content item. For example, since the error for each child region may be calculated based on the difference between the area of the rendered child region and the area of the rendered content assigned to the child region a negative or positive error amount may be indicative of an overrun or underrun of the rendered content item with respect to the assigned rendered child region.

At 388, the method 380 may include determining an overall error associated with the adjusted page structure. Determining an overall error associated with the adjusted page structure may include calculating the overall error associated with the adjusted page structure as the sum of the errors of each of the child regions determined from a second background rendering of the adjusted page structure.

The process of generating an adjusted page structure and determining the overall error associated with the page structure may be performed iteratively. As a result, a plurality of adjusted page structures may be generated and background rendered by a renderer.

At 390, the method 380 may include selecting a final page structure from a plurality of adjusted page structures, including the adjusted page structure. The final page structure may be a page structured to be utilized to render the content items into a final rendered document. The final rendered document may be a document that will be displayed.

The final page structure may be selected based on an overall error associated with each of the plurality of adjusted page structures. For example, selecting the final page structure may include selecting a final page structure with a lowest overall error among the plurality of adjusted page structures. The selected final page structure may be refined through truncation of the content items prior to be submitted for a rendering to a final document.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. As used herein, the designator "N", particularly with respect to reference numerals in the drawings, indicates that a number of the particular feature so designated can be included with examples of the present disclosure. The designators can represent the same or different numbers of the particular features. Further, as used herein, "a number of" an element and/or feature can refer to one or more of such elements and/or features.

What is claimed:

1. A system comprising:
a processor; and
a machine-readable medium comprising instructions executable by the processor to:
convert a binary tree representing a plurality of content items and having a plurality of levels of a plurality of nodes, including a root node corresponding to the content items, a plurality of internal nodes that each correspond to a sub-plurality of the content items, and a plurality of leaf nodes that each correspond to one of the content items, to a page structure having a plurality of regions to which the content items are assigned by, for each node of each level from a top level to a bottom level:
if the node is not a leaf node, bisecting a region of the page structure corresponding to the node into bisected regions, and respectively assigning child nodes of the node to the bisected regions; and
if the node is a leaf node, assigning the content item corresponding to the node to the bisected region to which the node has been assigned assigent;
iteratively repeating over a plurality of iterations, until an error associated with the page structure is less than a threshold:
for each region of the page structure, determine a region metric from a rendering of the page structure;
for each content item, determine an item metric from the rendering of the page structure;
calculate the error associated with the page structure based on, for each content item, the item metric for the content item in comparison to the region metric for the region to which the content item has been assigned;
adjust the page structure responsive to the error associated with the page structure being greater than the threshold; and
select an iteration of the page structure to render a final document, based on the error associated with the page structure determined at each iteration.

2. The system of claim 1, wherein an internal node of the binary tree representation includes an orthogonal bisection of the page structure.

3. The system of claim 1, wherein each leaf node of the binary tree representation corresponds to a region of the plurality of regions of the page structure.

4. The system of claim 1, wherein each leaf node of the binary tree representation corresponds to a discrete content item of the plurality of content items to be rendered in the final document.

5. The system of claim 1, wherein determining a region metric includes determining an area of each of the plurality of regions based on a height and width of each of the plurality of regions in the rendering.

6. The system of claim 1, wherein determining an item metric includes determining an area occupied by each of the plurality of content items based on a height and width of each of the plurality of content items in the rendering.

7. The system of claim 1, wherein calculating the error associated with the page structure includes calculating a difference between an area of the each of the plurality of regions of the rendering and an area of a corresponding content item rendered in each of the plurality regions of the rendering.

8. A non-transitory computer-readable medium containing instructions executable by a processor to cause the processor to:
convert a binary tree representing a plurality of content items and having a plurality of levels of a plurality of nodes, including a root node corresponding to the content items, a plurality of internal nodes that each correspond to a sub-plurality of the content items, and a plurality of leaf nodes that each correspond to one of the content items, to a page structure having a plurality of regions to which the content items are assigned by, for each node of each level from a top level to a bottom level:
if the node is not a leaf node, bisecting a region of the page structure corresponding to the node into bisected regions, and respectively assigning child nodes of the node to the bisected regions; and
if the node is a leaf node, assigning the content item corresponding to the node to the bisected region to which the node has been assigned;
iteratively repeat over a plurality of iterations, until an error associated with the page structure is less than a threshold:
determine, from a measurement of a background rendering of the initial structure, the error associated with the page structure from differences between areas of the content items within the background rendering and areas of the assigned corresponding regions within the background rendering;
adjust the page structure responsive to the error associated with the page structure being greater than the threshold; and
select an iteration of the page structure to render a document based on the error associated with the page structure at each iteration.

9. The non-transitory computer-readable medium of claim 8, wherein a background rendering comprises a rendering that is not displayed.

10. The non-transitory computer-readable medium of claim 8, wherein the content item is markup content.

11. A method comprising:
converting a binary tree representing a plurality of content items and having a plurality of levels of a plurality of nodes, including a root node corresponding to the content items, a plurality of internal nodes that each correspond to a sub-plurality of the content items, and a plurality of leaf nodes that each correspond to one of the content items, to a page structure having a plurality of regions to which the content items are assigned by, for each node of each level from a top level to a bottom level:
if the node is not a leaf node, bisecting a region of the page structure corresponding to the node into bisected regions, and respectively assigning child nodes of the node to the bisected regions; and
if the node is a leaf node, assigning the content item corresponding to the node to the bisected region to which the node has been assigned;
iteratively repeating over a plurality of iterations, until an error associated with the page structure is less than a threshold:
determining, from a background rendering of the page structure, the error associated with the page structure, based on, for each region, a difference between a region metric of the region and an item metric of the content item assigned to the region;

adjusting the page structure responsive to the error associated with the page structure being greater than the threshold;

selecting an iteration of the page structure to render a final document, based on the error associated with the page structure determined at each iteration.

12. The method of claim 11, comprising refining the final page structure through truncation of the content items.

13. The method of claim 11, wherein selecting the iteration of the page structure to render the final document comprises selecting the iteration of the page structure at which the error associated with the page structure is lowest.

14. The system of claim 1, wherein the processor is to, for each region of the page structure, determine the region metric comprises determining an area occupied within the page structure by the region, wherein the processor is to, for each content item, determine the item metric comprises determining an area occupied within the page structure by the content item.

15. The system of claim 14, wherein the processor is to calculate the error associated with the page structure based on, for each content item, the item metric for the content item in comparison to the region metric for the region to which the content item has been assigned by calculating the error associated with the structure based on, for each content item, a difference between the area occupied within the page structure by the content item and the area occupied within the page structure by the region to which the content item has been assigned.

16. The system of claim 15, wherein the processor is to calculate the error associated with the page structured based on, for each content item, the item metric for the content item in comparison to the region metric for the region to which the content item has been assigned by further calculating a sum of the differences calculated for the content items.

* * * * *